US012659008B2

(12) United States Patent
Matityahu

(10) Patent No.: US 12,659,008 B2
(45) Date of Patent: Jun. 16, 2026

(54) DYNAMIC 5G MASSIVE MIMO GOB CONFIGURATIONS OPTIMIZATION

(71) Applicant: Nokia Solutions and Networks Oy, Espoo (FI)

(72) Inventor: Ilan Matityahu, Kfar Sava (IL)

(73) Assignee: Nokia Solutions and Networks Oy, Espoo (FI)

( * ) Notice: Subject to any disclaimer, the term of this patent is extended or adjusted under 35 U.S.C. 154(b) by 13 days.

(21) Appl. No.: 18/912,427

(22) Filed: Oct. 10, 2024

(65) Prior Publication Data

US 2025/0141528 A1 May 1, 2025

(30) Foreign Application Priority Data

Oct. 25, 2023 (FI) ..................................... 20236188

(51) Int. Cl.
| | |
|---|---|
| *H04B 7/06* | (2006.01) |
| *H04B 7/0413* | (2017.01) |
| *H04W 48/20* | (2009.01) |

(52) U.S. Cl.
CPC ....... *H04B 7/06952* (2023.05); *H04B 7/0413* (2013.01); *H04W 48/20* (2013.01)

(58) Field of Classification Search
CPC ... H04B 7/02; H04B 7/04; H04B 7/06; H04B 7/0686; H04B 7/0695; H04B 7/06952;
(Continued)

(56) References Cited

U.S. PATENT DOCUMENTS

| | | | | |
|---|---|---|---|---|
| 9,948,376 | B1 * | 4/2018 | Pawar | ..................... H04L 5/005 |
| 10,194,333 | B2 * | 1/2019 | Takano | ................. H04W 16/28 |

(Continued)

FOREIGN PATENT DOCUMENTS

| | | |
|---|---|---|
| EP | 3226437 A1 | 10/2017 |
| WO | 2021/244912 A2 | 12/2021 |
| WO | 2022/232079 A1 | 11/2022 |

OTHER PUBLICATIONS

"3rd Generation Partnership Project; Technical Specification Group Radio Access Network; Evolved Universal Terrestrial Radio Access (E-UTRA); Physical layer procedures (Release 14)", 3GPP TS 36.213, V14.6.0, Mar. 2018, 466 pages.
(Continued)

*Primary Examiner* — James M Perez
(74) *Attorney, Agent, or Firm* — Nokia Solutions and Networks Oy

(57) ABSTRACT

There is provided an apparatus, a method and a computer program product. In accordance with an embodiment the method comprises selecting a candidate cell of a cellular network, the candidate cell comprising a massive multiple-in multiple out antenna capable of producing a plurality of groups of beams for a beamforming configuration and a beam for a non-beamforming configuration; obtaining measurement data from one or more user equipments in a geographical area served by the candidate cell at a plurality of time intervals; locating three-dimensionally the one or more user equipments; using the location information to determine three-dimensional dispersion of the one or more user equipments in the geographical area at the plurality of time intervals; determining spectral efficiency for the different groups of beam configurations and the non-beamforming configuration by using the three-dimensional dispersion and the measurement data for different groups of beam configurations at the plurality of time intervals; comparing the spectral efficiencies of the different groups of beam configurations with the spectral efficiency of the non-beamforming configuration; and selecting an optimal non-beamforming configuration or one of the groups of beam configurations for the cell at the plurality of time intervals.

19 Claims, 9 Drawing Sheets

(58) Field of Classification Search
CPC .. H04B 7/0413; H04B 7/0417; H04B 7/0452;
H04W 40/00; H04W 40/20; H04W 16/00;
H04W 16/24; H04W 16/28; H04W 72/04;
H04W 72/044; H04W 72/046
See application file for complete search history.

(56)                   References Cited

U.S. PATENT DOCUMENTS

| 10,530,453 | B1 * | 1/2020 | Sung | H04B 7/0626 |
|---|---|---|---|---|
| 10,863,399 | B2 * | 12/2020 | Li | H04B 7/0413 |
| 11,114,759 | B1 * | 9/2021 | Horn | H04B 7/0617 |
| 11,252,731 | B1 * | 2/2022 | Levitsky | H04B 7/0695 |
| 11,425,591 | B1 * | 8/2022 | Maggi | H04W 28/0205 |
| 11,451,288 | B2 * | 9/2022 | Acker | H04B 7/088 |
| 11,483,060 | B2 * | 10/2022 | Chaves | H04B 7/18504 |
| 11,646,776 | B2 * | 5/2023 | Gao | H04B 7/0617 370/329 |
| 12,216,234 | B2 * | 2/2025 | Sumi | G01S 7/52041 |
| 12,244,395 | B2 * | 3/2025 | Treesh | H04B 7/18541 |
| 12,400,116 | B2 * | 8/2025 | Liao | G06N 3/08 |
| 2006/0030311 | A1 * | 2/2006 | Cruz | H01Q 1/32 455/12.1 |
| 2007/0191066 | A1 * | 8/2007 | Khojastepour | H04B 7/0617 455/562.1 |
| 2014/0050280 | A1 * | 2/2014 | Stirling-Gallacher | H04B 7/0469 375/296 |
| 2015/0180632 | A1 * | 6/2015 | Kishiyama | H04W 24/08 370/252 |
| 2015/0189568 | A1 * | 7/2015 | Stanze | H04B 7/0417 370/331 |
| 2016/0021650 | A1 * | 1/2016 | Chembil-Palat | H04W 16/28 455/434 |
| 2016/0353424 | A1 * | 12/2016 | Stirling-Gallacher | H04B 7/0626 |
| 2017/0055162 | A1 * | 2/2017 | Takano | H04W 36/304 |
| 2017/0111852 | A1 * | 4/2017 | Selén | H04W 48/16 |
| 2017/0324604 | A1 * | 11/2017 | Estevez | H04B 7/0413 |
| 2018/0254815 | A1 * | 9/2018 | Liu | H04B 7/0626 |
| 2019/0068259 | A1 * | 2/2019 | Liu | H04B 7/061 |
| 2019/0288759 | A1 * | 9/2019 | Wakid | H04B 7/043 |
| 2019/0372644 | A1 * | 12/2019 | Chen | H04B 7/06952 |
| 2020/0044697 | A1 * | 2/2020 | Takano | H04W 16/28 |
| 2020/0136704 | A1 * | 4/2020 | Liu | H04B 7/0479 |
| 2020/0182995 | A1 * | 6/2020 | Zeng | G01S 13/003 |
| 2021/0083737 | A1 * | 3/2021 | Capdevielle | H04B 17/318 |
| 2021/0243768 | A1 * | 8/2021 | Thomas | H04B 7/088 |
| 2021/0314055 | A1 * | 10/2021 | Meshkati | H04B 17/309 |
| 2021/0336681 | A1 * | 10/2021 | Nagaraj | H04B 7/0617 |
| 2022/0086694 | A1 * | 3/2022 | Kons | H04B 7/024 |
| 2022/0131588 | A1 * | 4/2022 | Elshafie | H04B 7/0626 |
| 2022/0352933 | A1 * | 11/2022 | Rakib | H04B 7/0617 |
| 2022/0397663 | A1 * | 12/2022 | Sharma | G08G 5/22 |
| 2023/0155650 | A1 * | 5/2023 | Raghavan | H04B 7/0608 375/267 |
| 2023/0198730 | A1 * | 6/2023 | Gutman | H04W 52/245 370/278 |
| 2023/0214648 | A1 * | 7/2023 | Liao | G06N 3/0464 455/414.1 |
| 2023/0276192 | A1 * | 8/2023 | Cotanis | H04W 24/04 455/419 |
| 2023/0309147 | A1 * | 9/2023 | Li | H04L 5/005 |
| 2024/0088980 | A1 * | 3/2024 | Huang | H04B 7/0626 |
| 2024/0204853 | A1 * | 6/2024 | Ng | H04L 47/6225 |
| 2025/0141528 | A1 * | 5/2025 | Matityahu | H04B 7/0617 |
| 2025/0294577 | A1 * | 9/2025 | Liu | H04W 72/232 |

OTHER PUBLICATIONS

Kawser et al., "Downlink SNR to CQI Mapping for Different Multiple Antenna Techniques in LTE", International Journal of Information and Electronics Engineering, vol. 2, No. 5, Sep. 2012, pp. 757-760.

Maschietti et al., "Coordinated Beam Selection for Training Overhead Reduction in FDD Massive MIMO", 16th International Symposium on Wireless Communication Systems (ISWCS), Aug. 27-30, 2019, 5 pages.

Ganesan et al., "Integrating 3D Channel Model and Grid of Beams for 5G mMIMO System Level Simulations", IEEE 84th Vehicular Technology Conference (VTC-Fall), Sep. 18-21, 2016, 6 pages.

Office Action received for corresponding Finnish Patent Application No. 20236188, dated Apr. 3, 2024, 12 pages.

* cited by examiner

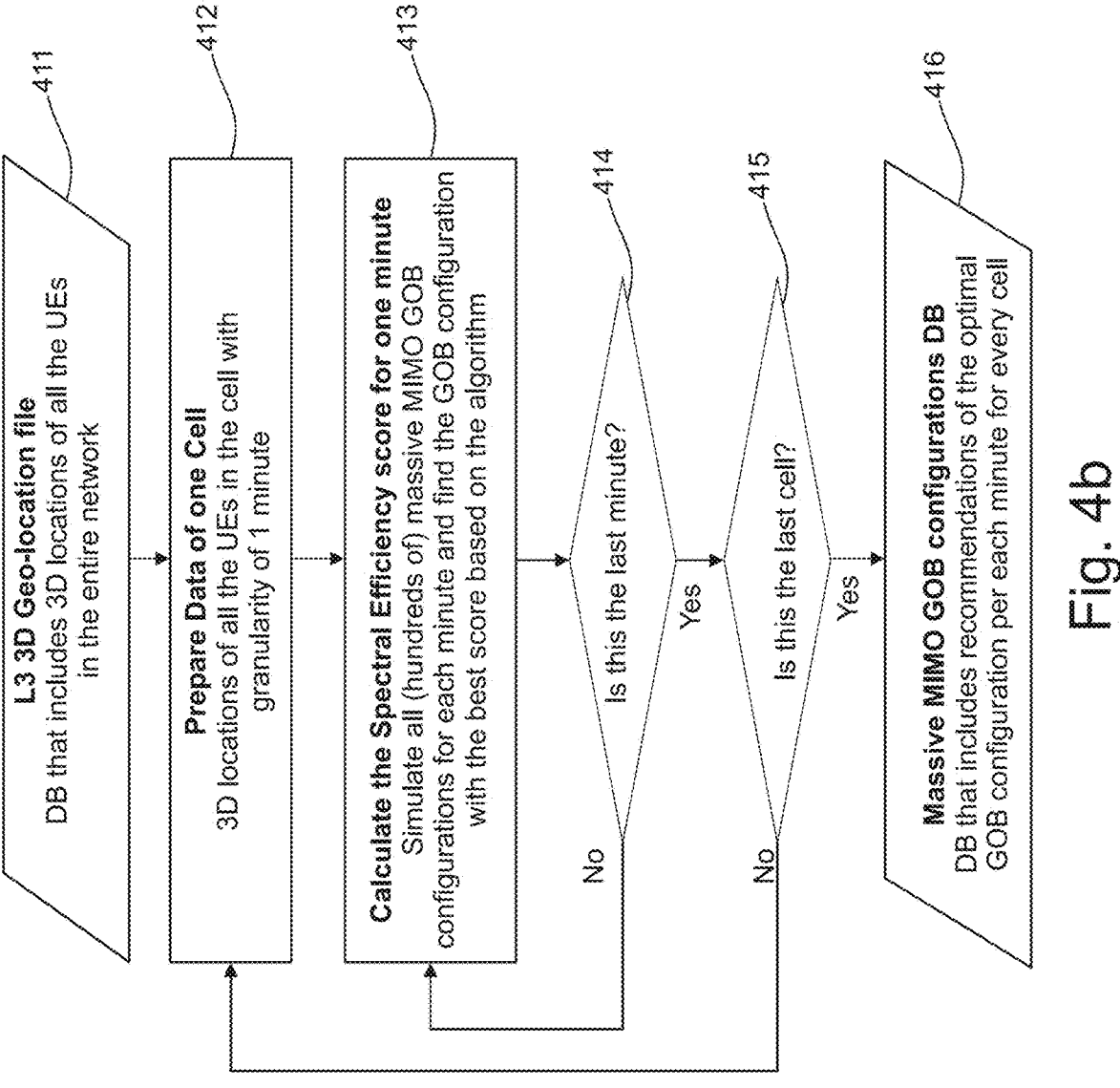

Fig. 4b

L3 3D Geo-location file
DB that includes 3D locations of all the UEs in the entire network
411

Prepare Data of one Cell
3D locations of all the UEs in the cell with granularity of 1 minute
412

Calculate the Spectral Efficiency score for one minute
Simulate all (hundreds of) massive MIMO GOB configurations for each minute and find the GOB configuration with the best score based on the algorithm
413

Is this the last minute?
414
No
Yes

Is this the last cell?
415
No
Yes

Massive MIMO GOB configurations DB
DB that includes recommendations of the optimal GOB configuration per each minute for every cell
416

DYNAMIC 5G MASSIVE MIMO GOB CONFIGURATIONS OPTIMIZATION

TECHNICAL FIELD

Embodiments of the present invention relate to a method and apparatus for dynamic 5$^{th}$ generation (5G) massive multiple-in multiple-out (MIMO) antenna grid of beams (GOB) configurations optimization based on three-dimensional geo-location of mobile dispersion.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR (5$^{th}$ generation New Radio) is a new radio access technology which has been developed by the 3$^{rd}$ generation partnership project (3GPP) for the 5$^{th}$ generation mobile communication networks (a.k.a. 5G cellular networks). 5G-NR has been specified within 3GPP to be able to coexist with 4G-LTE (4$^{th}$ generation Long Term Evolution) within the same spectrum. In 5G systems a base station may have a MIMO (Multiple In Multiple Out) antenna array comprising dozens of individual antenna elements. This kind of antenna may also be called as a massive MIMO antenna or a massive MIMO in this specification. Signals to and from those antenna elements can be controlled e.g. by signal-processing algorithms so that a good transmission route may be utilized through air to each user equipment. Then the base stations can send individual data packets in many different directions (with different beams). Beamforming allows many users and antennas on such MIMO array to exchange much more information at once, For millimeter waves used in 5G networks, beamforming is primarily used to address a different set of problems: cellular signals (signals of a mobile communication network) are easily blocked by objects and tend to weaken over long distances, wherein beamforming may help by focusing a signal in a concentrated beam that points only in the direction of a user equipment rather than broadcasting in many directions at once. This approach may increase the probability that the signals arrive intact and may also reduce interference for everyone else.

5G massive MIMO optimization is a completely new field in cellular networks. The 5G network radio optimization is fundamentally different from the 2G (2$^{nd}$ generation), 3G and 4G networks. Operators of 5G communication networks, which may also be called as service providers in this specification, may face very difficult challenges while deploying 5G massive MIMO equipment. One of the biggest challenges mobile operators of 5G networks (i.e. operators of the 5G mobile communication networks) may face is how to determine the optimal GOB (Grid Of Beams) configuration.

The challenge is due to the fact that there is no guarantee that beamforming will work in every environment. Beamforming performances are exposed to various environmental conditions (e.g. UEs dispersion, Radio coverage, Radio interference, speed of the subscriber's movement, etc.) that may impair its performance to such an extent that they may even be inferior to those of a standard 4G antenna.

The term subscriber means a user of a mobile communications device, wherein when subscriber movements are referred in this specification, it is actually movements of the mobile communications device which is meant.

SUMMARY

Some embodiments provide a method and apparatus for massive MIMO optimization.

Some embodiments are implemented in the context of the 5G communication systems and relate to massive MIMO utilization in base stations. According to an embodiment, there is provided a method and an algorithm using three-dimensional (3D) geo-location capabilities of a communication network. These capabilities can be used to calculate a gain/loss score of the massive MIMO antenna for real 3D subscribers dispersion at any time window.

One solution is based on real 3D dispersion measurement of subscribers in a region. Stability of this dispersion may also be considered since it may not be guaranteed all the time. Also, it may not be guaranteed that beamforming will work properly all the time.

Additionally, according to an embodiment, a method is provided to estimate in advance the massive MIMO gain/loss score (e.g. 3%, 200%) for different 3D dispersion scenarios. This score may be critical for both GOB configuration optimal selection based on scores comparison and also to allow calculation of the business value and ROI based on tangible parameter.

3D dispersion information utilizes a three-dimensional geo-location capability, and it can be used to make the decision because the GOB configuration is also three-dimensional. In addition to the three-dimensional dispersion information also tangible massive MIMO gain/loss score may be used as well. This score provides the customer the tool to analyze the dispersion at any point of time and to define the following:

Simple Go/No Go decision per each candidate cell for massive MIMO,

Static or Dynamic optimal GOB configuration plan per a time unit, e.g. per hour, Beamforming Activation/Non-activation plan per each time unit.

One idea is to use the 3D geo-location capabilities that will provide the method to calculate the massive MIMO gain/loss score for each real 3D subscribers dispersion at a time window.

In accordance with an embodiment, the score determination is performed on short time units, for example every half of a minute, every minute, or every 2 minutes or on some other regular, relatively short time interval. This kind of score determination may enable the performance analysis of each GOB configuration dynamically. The optimization capabilities for dynamic scenarios may also be valid for static scenarios where there is no need to change the configuration. In these cases the algorithm may identify an optimal configuration and direct the beams of the massive MIMO based on the real 3D load dispersion and not based on standard radio simulations.

The tangible score may be reported in units of gain/loss in spectral efficiency, which may be expressed as a spectral efficiency index, between the GOB configuration under test relative to a non-beamforming configuration. The use of the spectral efficiency index to indicate gain/loss may allow a service provider to quantify this into financial profit/loss indices. For example, the degree of increase in cell capacity may allow the service provider to convert this into an increase in financial profit due to higher average revenue per user (ARPU). This may be achieved e.g. so that costs of transferred data may depend on altitude (high speed browsing packages induce higher cost at higher altitudes) or the number of subscribers may be increased while maintaining the same level of performance. In this way, the operator may be able to evaluate and improve the return on investment (ROI) of the investment in 5G massive MIMO antennas.

In conclusion, there are basically at least three improvements to the current methods:

Dynamism—there is provided a solution that addresses the need for dynamic GOB configuration change. (It should be noted that this is not about the dynamism of the standard choice of the active beams, but rather a dynamic change in the choice of the optimal GOB configuration. Also, it may detect periods of time when beamforming is not optimal and causing a performance loss in compared to LTE, so it is recommended to activate/deactivated it dynamically.

Tangible score for the purposes of business analysis and automation-currently there is no tangible information on the degree of gain/loss of the optimal GOB in hourly level that may allow the customer's business calculations (e.g. ROI) to be performed. For example, is the spectral efficiency gain for a specific hour provided by the optimal GOB configuration 3% or 300%? In addition, the score may make it possible to automate the process based on thresholds and may prevent the need for manual intervention or exercise of intelligent judgment.

3D dispersion analysis—In accordance with an embodiment, an idea is based on 3D geo-location-based dispersion for 3D massive MIMO GOB configuration optimization.

The approach presented in this specification may make it possible to measure the spectral efficiency in the existing radio conditions, perform three-dimensional radio simulations of the GOB configuration, convert the new radio state to spectral efficiency and compare the result to the original. In this way, the degree of gain/loss can be automatically calculated for each of the possible GOB configurations and the optimal one can be determined.

An advantage of this solution is the business value for the network operator. It may improve the cellular network performance that may lead to higher ARPU (e.g. higher probability to sale more expensive internet browsing packages) or increase the revenue due to higher number of end users. Both options may improve the operator's ROI. Also, it will assist to avoid network performance degradation in wrong locations and save installation cost. A low radio performance might increase the churn rate of the network operator's end users.

According to an embodiment, there is provided a method, to be employed by a user equipment, to perform optimization of antenna configurations of gNB(s).

According to some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided an apparatus comprising at least one processor; and at least one memory storing instructions that, when executed by the at least one processor, cause the apparatus to perform at least the following:

selecting a candidate cell of a cellular network, the candidate cell comprising a massive multiple-in multiple out antenna capable of producing a plurality of groups of beams for a beamforming configuration and a beam for a non-beamforming configuration;

obtaining measurement data from one or more user equipments in a geographical area served by the candidate cell at a plurality of time intervals;

locating three-dimensionally the one or more user equipments;

using the location information to determine three-dimensional dispersion of the one or more user equipments in the geographical area at the plurality of time intervals;

determining spectral efficiency for the different groups of beam configurations and the non-beamforming configuration by using the three-dimensional dispersion and the measurement data for different groups of beam configurations at the plurality of time intervals;

comparing the spectral efficiencies of the different groups of beam configurations with the spectral efficiency of the non-beamforming configuration; and selecting an optimal non-beamforming configuration or one of the groups of beam configurations for the cell at the plurality of time intervals:

According to a second aspect there is provided a method comprising:

selecting a candidate cell of a cellular network, the candidate cell comprising a massive multiple-in multiple out antenna capable of producing a plurality of groups of beams for a beamforming configuration and a beam for a non-beamforming configuration;

obtaining measurement data from one or more user equipments in a geographical area served by the candidate cell at a plurality of time intervals;

locating three-dimensionally the one or more user equipments;

using the location information to determine three-dimensional dispersion of the one or more user equipments in the geographical area at the plurality of time intervals;

determining spectral efficiency for the different groups of beam configurations and the non-beamforming configuration by using the three-dimensional dispersion and the measurement data for different groups of beam configurations at the plurality of time intervals;

comparing the spectral efficiencies of the different groups of beam configurations with the spectral efficiency of the non-beamforming configuration; and selecting an optimal non-beamforming configuration or one of the groups of beam configurations for the cell at the plurality of time intervals.

According to a third aspect there is provided an apparatus comprising:

means for selecting a candidate cell of a cellular network, the candidate cell comprising a massive multiple-in multiple out antenna capable of producing a plurality of groups of beams for a beamforming configuration and a beam for a non-beamforming configuration;

means for obtaining measurement data from one or more user equipments in a geographical area served by the candidate cell at a plurality of time intervals;

means for locating three-dimensionally the one or more user equipments;

means for using the location information to determine three-dimensional dispersion of the one or more user equipments in the geographical area at the plurality of time intervals;

means for determining spectral efficiency for the different groups of beam configurations and the non-beamforming configuration by using the three-dimensional dispersion and the measurement data for different groups of beam configurations at the plurality of time intervals;

means for comparing the spectral efficiencies of the different groups of beam configurations with the spectral efficiency of the non-beamforming configuration; and means for selecting an optimal non-beamforming configuration or one of the groups of beam configurations for the cell at the plurality of time intervals.

According to a fourth aspect there is provided an apparatus comprising:

a first circuitry configured to select a candidate cell of a cellular network, the candidate cell comprising a massive multiple-in multiple out antenna capable of producing a plurality of groups of beams for a beamforming configuration and a beam for a non-beamforming configuration;

a second circuitry configured to obtain measurement data from one or more user equipments in a geographical area served by the candidate cell at a plurality of time intervals;

a third circuitry configured to locate three-dimensionally the one or more user equipments;

a fourth circuitry configured to use the location information to determine three-dimensional dispersion of the one or more user equipments in the geographical area at the plurality of time intervals;

a fifth circuitry configured to determine spectral efficiency for the different groups of beam configurations and the non-beamforming configuration by using the three-dimensional dispersion and the measurement data for different groups of beam configurations at the plurality of time intervals;

a sixth circuitry configured to compare the spectral efficiencies of the different groups of beam configurations with the spectral efficiency of the non-beamforming configuration; and a seventh circuitry configured to select an optimal non-beamforming configuration or one of the groups of beam configurations for the cell at the plurality of time intervals.

According to a fifth aspect there is provided a computer program product including computer program code the at least one memory and the computer program code configured to, with the at least one processor, cause the apparatus to perform at least the following:

selecting a candidate cell of a cellular network, the candidate cell comprising a massive multiple-in multiple out antenna capable of producing a plurality of groups of beams for a beamforming configuration and a beam for a non-beamforming configuration;

obtaining measurement data from one or more user equipments in a geographical area served by the candidate cell at a plurality of time intervals;

locating three-dimensionally the one or more user equipments;

using the location information to determine three-dimensional dispersion of the one or more user equipments in the geographical area at the plurality of time intervals;

determining spectral efficiency for the different groups of beam configurations and the non-beamforming configuration by using the three-dimensional dispersion and the measurement data for different groups of beam configurations at the plurality of time intervals;

comparing the spectral efficiencies of the different groups of beam configurations with the spectral efficiency of the non-beamforming configuration; and

selecting an optimal non-beamforming configuration or one of the groups of beam configurations for the cell at the plurality of time intervals.

BRIEF DESCRIPTION OF THE DRAWINGS

For a more complete understanding of example embodiments of the present invention, reference is now made to the following descriptions taken in connection with the accompanying drawings in which:

FIG. 4b shows an example of a Phase C of the analyses process of FIG. 3, in accordance with an embodiment;

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
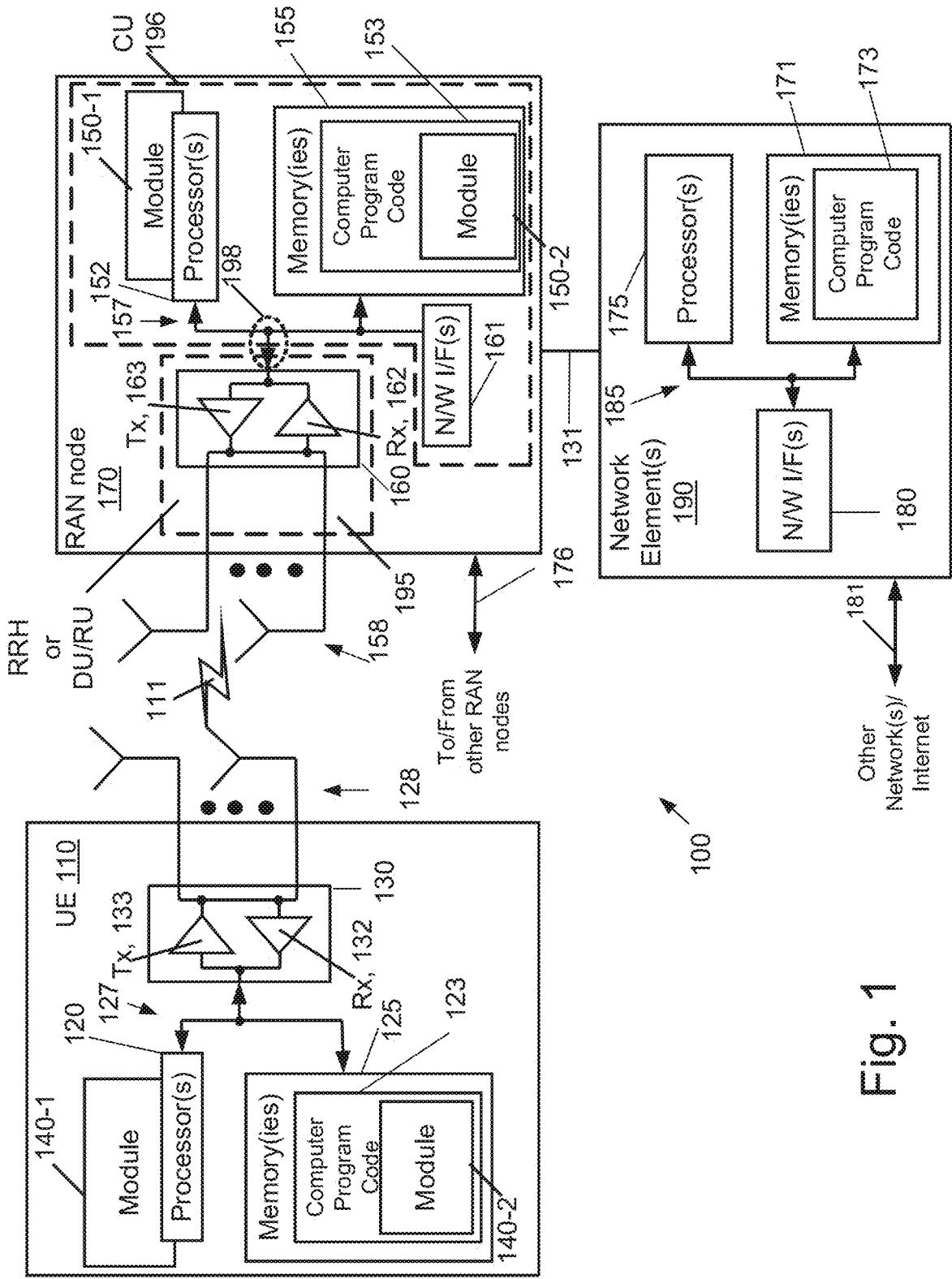
FIG. 1 shows a block diagram of one possible and non-limiting example in which the examples may be practiced.

FIG. 1 shows a block diagram of one possible and non-limiting example in which the examples may be practiced. A user equipment (UE) 110 (also called as a user device, a user terminal, a terminal device, a wireless device, a mobile station (MS) etc.), radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB (a next generation NodeB) or an ng-eNB. A gNB is a node providing NR user plane and control plane protocol terminations towards the UE and connected via the NG interface to a 5G core network (5GC), such as, for example, the network element(s) 190. The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

Figures 2A, 2B:
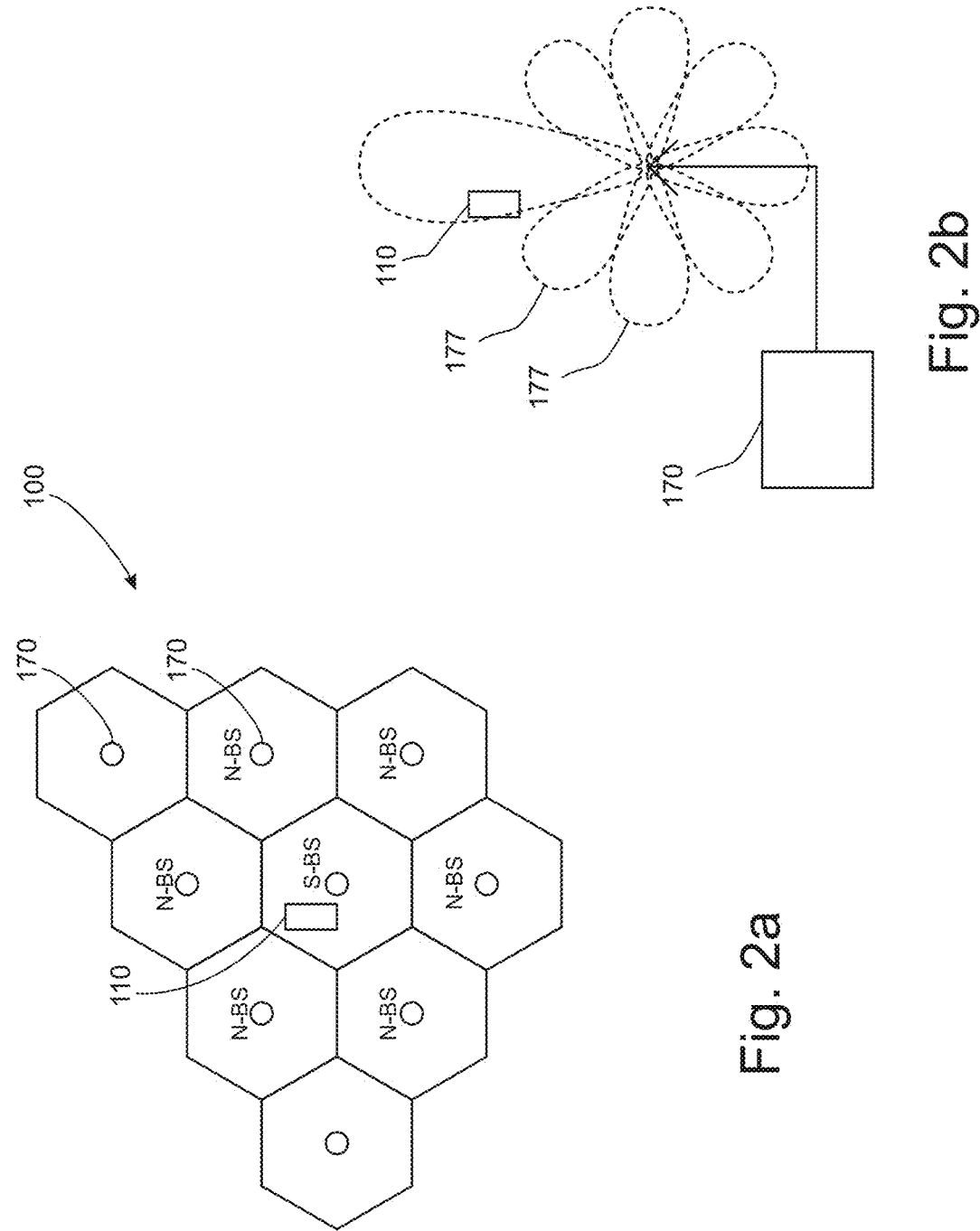
FIG. 2a illustrates a part of a wireless network having several base stations and an exemplary user equipment.
FIG. 2b illustrates in a simplified manner beams of a base station serving an exemplary user equipment.

FIG. 2a illustrates a part of a wireless network 100 having several base stations 170 and an exemplary user equipment 110. In FIG. 2a it is assumed that the base station marked as S-BS is the serving base station, when the user equipment is in connected mode, and the base station where the user equipment is camped on when not in connected mode. Some of the neighbouring base stations are labelled as N-BS in FIG. 2a. In practical situations the serving base station and the camped on base station may change e.g. when the user equipment in moving, or if the signal strength from different base stations changes (e.g. signals from a neighbouring base station N-BS becomes stronger than signals from the currently serving base station.

The serving base station may have assigned one or more beams 177 (FIG. 2b) for the user equipment on the basis of some criteria. For example, that beam which is directed towards the location of the user equipment may be selected for the user equipment and if the user equipment moves to another location, another beam directed towards that new location may be selected instead. In FIG. 2b most of the beams are illustrated being similar to each other and one beam is illustrated to have stronger signal than the others but in practical implementations different beams may have different parameters such as signal strength, width length etc. It should also be noted that the beams depicted in FIG. 2b are only illustrative but in reality the beams may have different forms and sizes.

A base station may have a spatial beam codebook which includes information of beams available by a base station.

A spatial beam codebook may be defined as follows, for example.

A spatial beam codebook of size $N_B$ and whose elements are indexed by b is defined, wherein b=1, 2, . . . , $N_B$. Each spatial beam (worded as beam henceforth) corresponds to a radiation pattern whose main lobe is uniquely directed to an angular direction with respect to the antenna array broadside in both the azimuth (i.e. horizontal) and zenith (i.e. vertical) planes. The angular direction for the bth beam may be denoted as $(h_p, v_b)$ where $h_b$ and $v_b$ are horizontal angles and vertical angles of the bth beam, respectively.

A beam-frequency resource pool (also worded as resource pool henceforth) may be defined as follows, in accordance with an embodiment.

A beam-frequency resource is a resource for data transmission consisting of a set of subcarriers (i.e. a resource block) that are sent over multiple antennas and whose per-antenna weight is determined by the beam index. Each beam-frequency resource is addressed either by the pair (b, f) or the triplet ($h_b$, $v_b$, f) where $$f = 1, 2, \ldots, N_F^{Global}$$

where $$N_F^{Global}$$

is the global total number of frequency resources. The global resource pool can be denoted as $A^{Global} = \{(b, f) | \forall b, \forall f\}$.

The beam-frequency resource pool is the set of paired resources for use by a RAT. In general, the resource pools are non-orthogonal (i.e. may be interfering) to each other.

In the following, some embodiments of a method are described to be employed by a user equipment, and a user equipment, to perform energy efficient mobility-status evaluation and corresponding RRM measurements relaxation, which depends on radio channel parameter estimates acquired by the user equipment, and a user equipment-internal beam-level relaxation evaluation.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

To determine the optimal grid of beams configuration is not only dependent at one point in time but is divided into several challenges throughout the massive MIMO deployment stages. It starts at an initial stage before the installation of the antenna, wherein the operator needs to decide whether to replace the 4G antenna with a massive MIMO antenna. The decision may be based on two parameters. The first parameter may be the determination if the massive MIMO will work at all in the specific location. If it does, then the operator calculates, if the estimate performance gain is enough to justify the large investment with a reasonable return on investment. Installation in a wrong place can cause a decrease in performance, end-users' complaints, switching to competitors and financial loss due to unnecessary installation.

After the installation of the massive MIMO antenna, during the on-going optimization, there is a need to continue monitoring the performance. During the on-going optimization, the second technical challenge is how to optimize the selection of the optimal GOB configuration. There may be hundreds of different massive MIMO GOB configurations (e.g. different beam set, beam refinement, opening angle, tilt). The correct GOB may be based on the UE's traffic dispersion in 3D, but the dispersion is not necessarily fixed and might change over time. This may require different GOB configurations in different times, e.g. in different hours of a day, in different weekdays etc.

Also, it's not guaranteed that beamforming will work properly all the time. For example, in highways in the hours that the speed of vehicles driving on the highway is high, there is a high probability that beamforming will not work properly compared to the situation that the speed of vehicles is quite slow, such as during rush hours. In this scenario, for these specific hours, there may be a need to deactivate the beamforming to avoid performance degradation. From the operator business point of view, there may be a need to define optimal GOB for both static and dynamic traffic dispersion of the UEs. In case of dynamic UE's traffic dispersion, there may be a need to identify if there is a repeated daily/weekly pattern. If such pattern can be determined, it may allow to set dynamic GOB configuration per each hour and day based on the detected pattern, for example so that during rush hours at weekdays the beamforming is not used (switched off) and during other times the beamforming is switched on.

The above-mentioned criteria of high speed and low speed may not be the same at each locations and may depend on, for example, the base station constellation and antenna configurations at the base stations and also the type of the roads, highways etc. The purpose of the speed-based criteria is not to define exact limits but to illustrate that the amount of traffic and speed of vehicles driving on the roads may have effect on whether to use beamforming or not.

One of the challenges to be coped with is that configuration of the buildings (e.g. location, amount, and height of buildings) does not always allow for a logical determination. In the scenario of a high and dominant building in a low environment, i.e. where the most of the buildings are remarkably lower than the dominant building or buildings, it is reasonable to assume a certain configuration known to be efficient for such environments. As an example of such configuration is a massive MIMO antenna having four vertical layers of two beams in each layer. This configuration can be indicated as #2#2#2#2.

However, it may not be a straightforward task to correctly choose an antenna configuration in a scenario with many high buildings standing next to each other. It may not be evident to which points in the three-dimensional space the energy should be concentrated. Is the distribution of traffic homogeneous? Is it stable over time?

In addition, when it is necessary to provide service to highways, beamforming may not function well when the road is not busy, and the speed of the vehicles is relatively high.

In conclusion, understanding the environment and using radio simulations may not provide the optimal answer for choosing the GOB configuration.

In the following a description of an algorithm and a method utilizing the algorithm will be described in more detail.

It is assumed that a cellular network is dynamic and to create an effective optimization for each cell a way should be found that will allow a combination of two requirements.

The first requirement is to analyze and provide score for each of the hundreds of possible massive MIMO GOB configurations with a resolution of a certain time interval, such as every minute. This resolution allows to define the optimal GOB configuration for each such time interval, calculates the most common GOB per certain multiples of the time interval, such as each hour, and identify a repeated pattern for this cell, for example the repeated patterns can be hourly/daily/weekly. In the following, the multiple of the time interval (e.g. an hour) will also be called as a cumulative time interval.

The second requirement is to perform the prediction passively without active intervention, which includes a momentary change of the configuration of the GOB in the gNB, and this should avoid the possibility of damage to the cell coverage or any deterioration in its performance.

Figure 3:
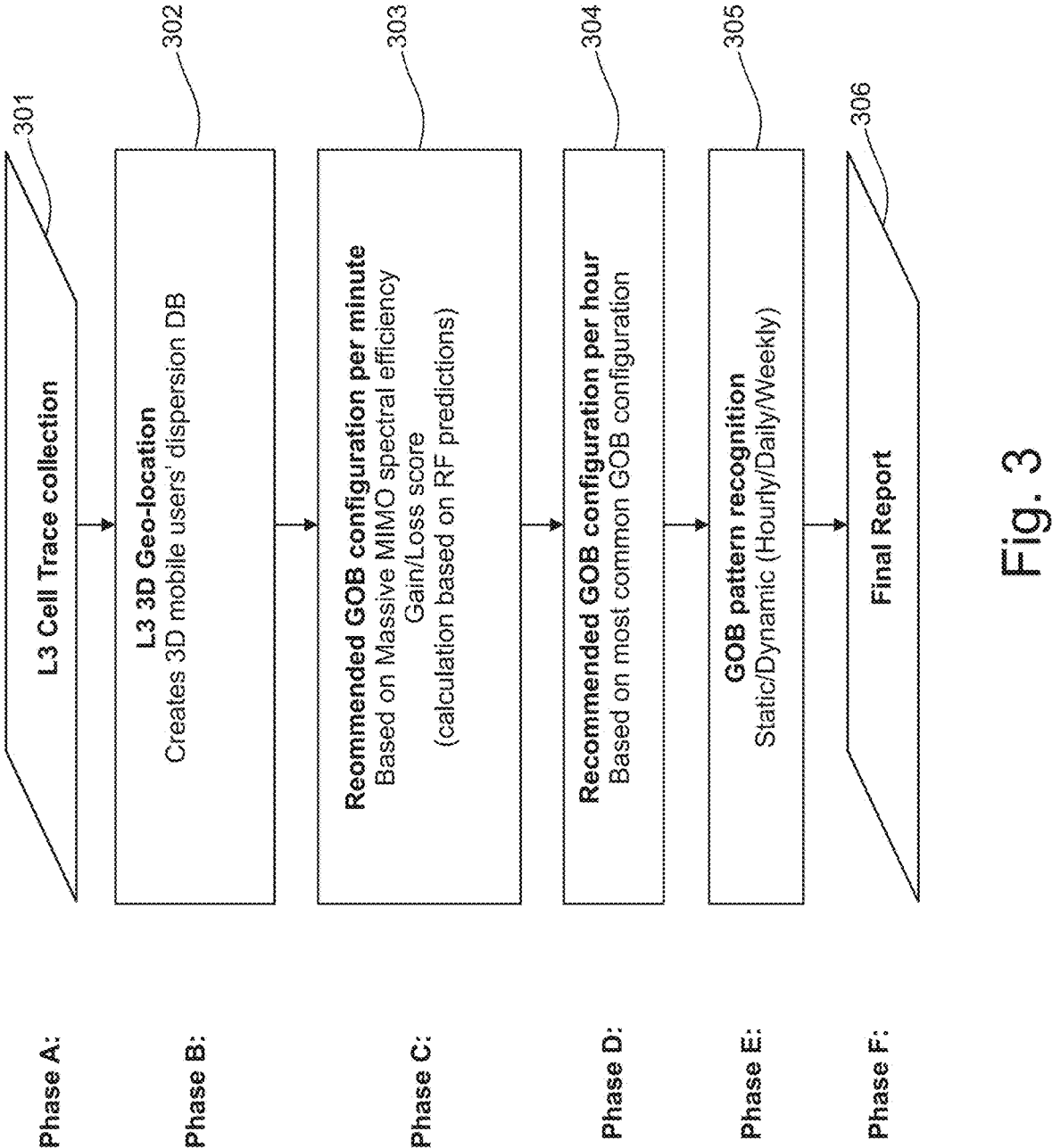
FIG. 3 illustrates an example of an analyses process, in accordance with an embodiment.

It is assumed in the following that one or more candidate cells of a mobile communication network is selected for analyses. Then, in accordance with an embodiment, the analysis process for each candidate cell as follows, with reference to FIG. 3.

At Phase A—Layer 3 (L3) Cell Trace collection 301. The process starts with a collection of L3 cell traces. This feature enables the network to collect certain information related to a UE and/or a gNB based on signals transmitted by the UE and/or the gNB. Such information is, for example, measurement information from the UE such as quality of service (QoS) and/or quality of experience (QoE), location of the UE.

Figure 4A:
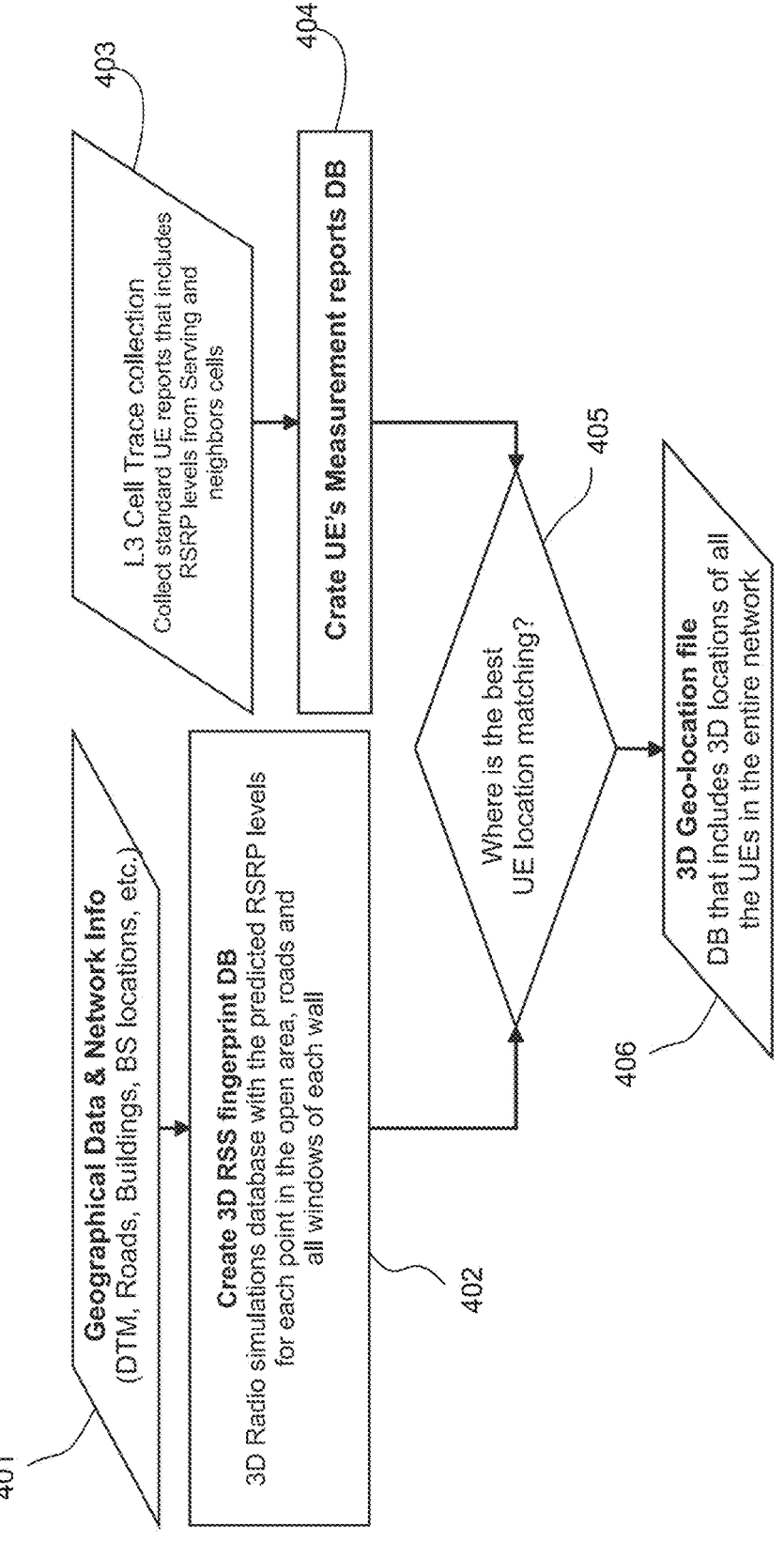
FIG. 4a shows an example of a three-dimensional geo-location based on received signal strength fingerprinting.

Phase B—Three-dimensional geo-location 302. Each measurement report of the cell trace is geo-located in 3D e.g. based on Nokia's geo-location micro-service. 3D geo-location is a method based on received signal strength (RSS) fingerprinting and is illustrated in FIG. 4a in a simplified manner, in accordance with an approach. The idea is based on matching two databases 402, 404, one 404 of the databases including the radio measurements reported by the UE as part of the standard process of the cellular network and the other database 402 predicting the propagation of three-dimensional waves on a geographic model. In a first step, a three-dimensional geographic model is created 301, which includes the ground height, streets, vegetation and buildings of an area to be charted. After that, information about the cellular sites is added and a 3D radio wave propagation prediction is performed for a plurality of points (e.g. for each point) in the ground, on the roads and for each window in each building wall in the area. The propagation model is, for example, a proprietary model of Nokia that takes many parameters into account, such as ground effects, reflections, and diffractions, etc. This information is stored in the first database 402, which may be called as a 3D RSS fingerprint database.

In a second step, information is collected 403 from the cellular network which includes the standard reports of each UE for the reception strengths of the serving cell and the neighboring cells it receives. This information is used to create the second database 404, which may be called as a UE measurement report database.

A third step is to perform a matching 405 between each measurement in the second data base 404 and the RSS fingerprinting found in the first data base 402. The point in the three-dimensional space that is most compatible in terms of intensities with the measurement report will be declared as its three-dimensional location. These three-dimensional locations may be stored into a 3D geo-location file 406.

The objective is to create 3D mobile users' dispersion database 406 i.e. information on locations of UEs in the region covered by the query (notify-request).

Phase C—Recommended GOB configuration per the time interval such as per minute 303. The algorithm uses the 3D UEs locations dispersion and their radio performance. The radio performance may be based, for example, measurement results such as received signal received power (RSRP), channel quality indicator (CQI), etc. to simulate all hundreds of massive MIMO GOB configurations for each time interval. One or more, possibly each possible MIMO GOB configuration may be compared to a non-beamforming configuration and the provided spectral efficiency score reflects the spectral efficiency gain (improvement) or loss (deterioration) of the spectral efficiency of the compared MIMO GOB configuration(s) with respect to the non-beamforming configuration. As an example, loss might happen in highways with high-speed traffic.

FIG. 4b illustrates an example embodiment of Phase C. At step 411 the 3D geo-location file 406 is obtained, e.g., from a memory of an apparatus. As it was mentioned above, the 3D geo-location file 406 may be a database that includes 3D locations of all the Ues in the entire network. At step 412 data for one cell is prepared so that 3D locations of all the Ues in the cell is obtained with granularity of one minute. The, at step 413, the spectral efficiency score is calculated for each minute. This may be performed by simulating all (hundreds of) massive MIMO GOB configurations for each minute and the GOB configuration with the best score is searched based on the algorithm. At step 414 it is checked if this is the last minute to be examined. If not so, the procedure returns back to the step 413 to calculate the spectral efficiency for another minute. When all the time to be considered regarding the current cell have been handled, the procedure continues at step 415 to check whether this was the last cell to process. If not so, the procedure returns back to the step 412 to select another cell. After all the cells to be considered have been processed, the massive MIMO GOB database 416 is ready.

Phase D—Recommended GOB configuration per the cumulative time interval 304. The next step is to find the most common massive MIMO GOB configuration in each cumulative time interval based on the score per each time interval from the previous phase. The idea is to find the most common GPB configuration that may provide the maximum spectral efficiency if it will be selected for the entire cumulative time interval.

Phase E—GOB pattern recognition 305. The input to this step is a weighted score during the cumulative time interval that includes an accurate recommendation for the optimal GOB configuration every cumulative time interval over a long period (for example, one month). Now it may be possible to identify repetitive patterns if there are any, identification of certain cumulative time intervals of a day, differences between weekends and working days, periods of time in which it may be necessary to turn off the beamforming because it causes losses and wasted power. Another option is that the 3D traffic over time is relatively static and there is no need to change the GOB configuration over time.

Phase F—Final report 306. The last step in the analysis of each cell is to prepare a final report that may be used by the mobile network operator to optimally configure each massive MIMO cell. This process may be repeated every time for each candidate cell. The tangible score may be reported in units of gain/loss of the SE (Spectral Efficiency) between the GOB configuration being tested relative to non-beamforming massive MIMO GOB configuration (or an original 4G antenna).

An approach for calculating spectral efficiency is based on a collection of three parameters from the cell trace information:

$$\text{Spectral efficiency=Payload (bits)/Time (Sec)/BW (Hz)}$$

Spectral efficiency units are bit, s and Hz.

An example of a standard calculation of down link (DL) spectral efficiency based on collection from an operator's network is as follows:

$$\text{Payload (bits)} =$$
$$GBR + \text{None } GBR = 8^* (\text{dl\_gbr\_bytes} + \text{dl\_gbr\_non\_bytes})$$

$$\text{Time (Sec)} = \#\text{TTI}/1000 = \text{num\_of\_tti\_positive\_dl\_buff}/1000$$

$$BW \text{ (Hz)} = \text{pdsch\_prb\_number} * 180,000$$

$$DL \left(\text{Spectral efficiency} = [8*(\text{dl\_gbr\_bytes} + \text{dl\_gbr\_non\_bytes})]/\right.$$
$$\left. [(\text{num\_of\_tti\_positive\_dl\_buf}/1000)^*(\text{pdsch\_prb\_number}^*180,000)]\right)$$

These parameters are available for the current 4G antenna but not for the different GOB configurations. However, the approach presented in this specification uses the 3D geo-located data as an input, combines different calculations, radio measurements, 3D radio simulations and conversion tables from 3GPP standard that allows to predict the gain/loss score of a massive MIMO GOB configuration.

The calculation of the spectral efficiency for each cell is based on receiving three-dimensional geo-location data that includes the radio parameters and is divided into the following steps.

Figure 5:
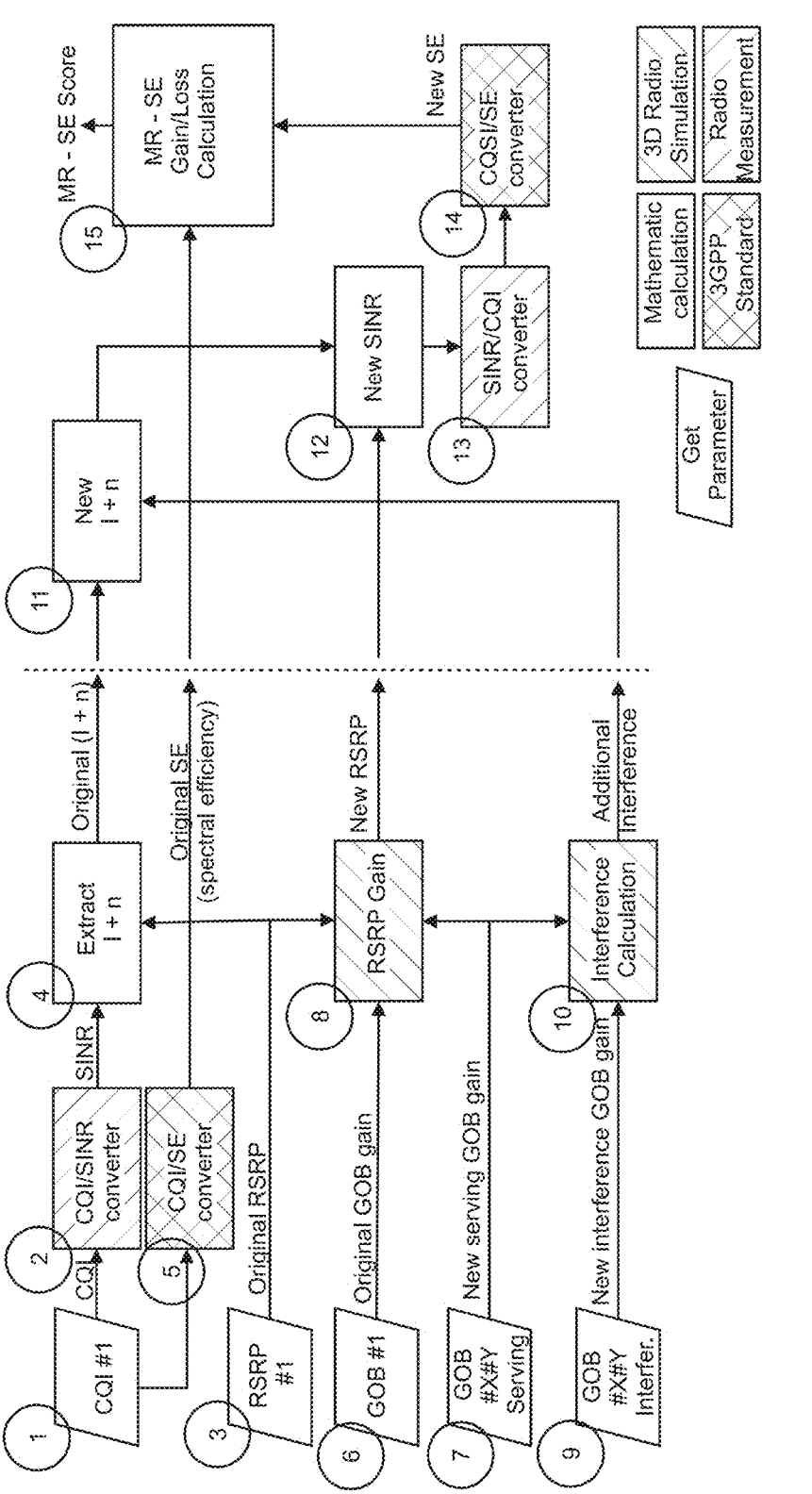
FIG. 5 illustrates spectral efficiency score calculation, in accordance with an embodiment.

At Step A the spectral efficiency change at the level of each measurement report (MR) is calculated for one time interval. This is illustrated in FIG. 5, in accordance with an embodiment. The numbers inside the circles illustrate an order of the steps performed. However, it should be noted that some of the steps may be performed in another order than depicted in FIG. 5. The algorithm calculates the improvement in spectral efficiency for each measurement report when it considers its three-dimensional position relative to the antenna position. Then, the current UE session radio condition (original antenna without beamforming) is analysed which includes the RSRP and quality of the original reception. The level of external interference and its environmental noise level are identified, and the current spectral efficiency is calculated. Then, a three-dimensional radio simulation of one of the configurations is performed that includes, on the one hand, the improvement of coverage because of the narrowness of the beam that provides service, and on the other hand, the increase of the level of interference because of activating additional beams.

At Step B the total spectral efficiency of each beam is calculated, e.g., according to the above mentioned standard spectral efficiency calculations.

At Step C the total spectral efficiency of the entire cell is calculated, e.g., as a sum of all the SE beams.

At Step D the process of Steps A to C are repeated for the duration of the cumulative time interval (e.g., 60 min, entire hour).

At Step E the final score for this cumulative time interval is calculated.

At Step F Steps A to E are repeated for all the cumulative time interval (e.g., for 24 hours).

At Step G Steps A to F are repeated for all candidate cells.

In the following, various tasks of Step A will be described in more detail with reference to FIG. 5, in accordance with an embodiment.

The numbers in the circles in FIG. 5 indicate the task number and its position in the calculations order.

In the following the various tasks will be described in more detail with reference to FIG. 5.

For the purpose of simplifying the explanation, the radio analysis will refer to a 2D scenario where an initial GOB configuration without beamforming (#1 or the original 4G antenna pattern) will be compared to a single layer configuration. In this example, GOB configuration #6 was selected. The example includes two UEs, UE1 and UE2, wherein the spectral efficiency score is calculated for UE1, while UE2 is used to activate an additional beam of the GOB #6 to simulate internal interference between the beams.

When a real cellular network analysis is performed, the analysis will be in a 3D simulation, but the algorithm principle will be the same. It will examine the entire GOB configurations, different beam widths and all the up/down tilts. Also, the concept is demonstrated and explained based on Synchronization Signal Block (SSB) beams only and the refined beams were not included in the explanation. In a real project, the algorithm should include the refined beams as part of the 3D simulations, depending on the activation of this mode. Also, the explanations relate to Equal Time (Scheduler mode), while in real project there may be a need to consider also Equal Rate and Proportional Fair modes.

It should be noted that the calculations described below explain the concept and may not include all the calculations precisely.

Figure 6B:
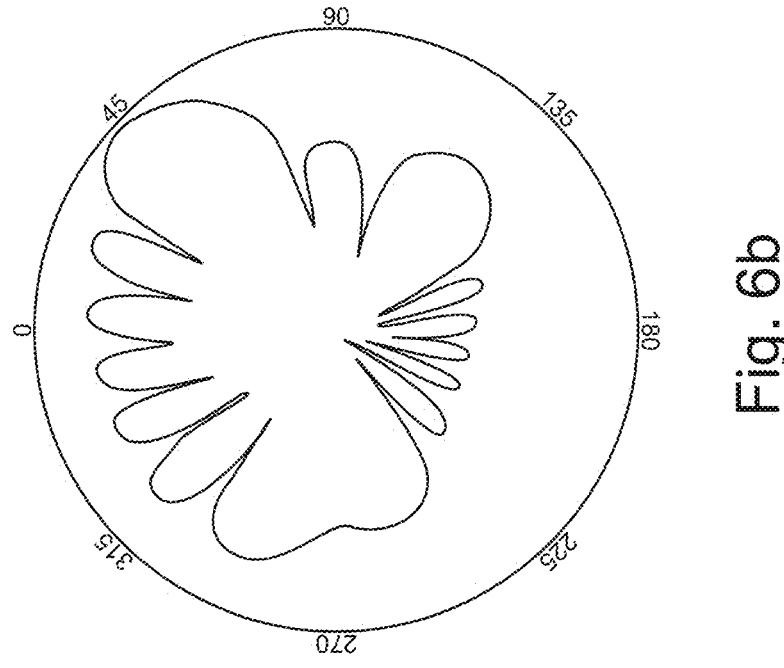
FIG. 6b illustrates an example of a radiation pattern simulation at a certain elevation angle.
Figure 6A:
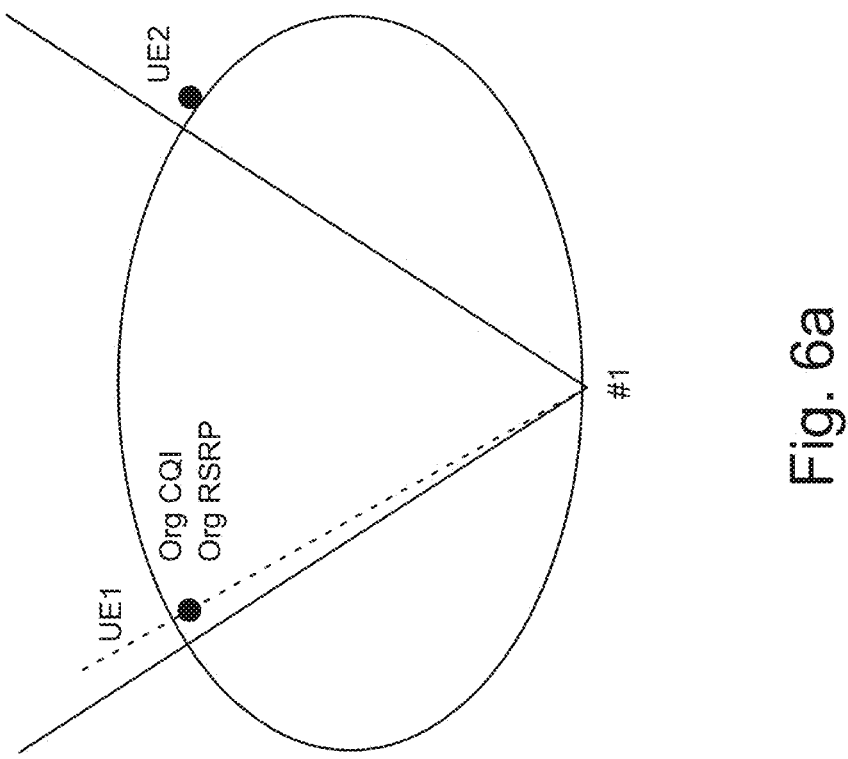
FIG. 6a illustrates an initial radio condition of an example situation.

The process starts at Task #1 with a collection of radio parameters of the measurement reports in a period of one time interval. In other words, the current CQI parameter (CQI #1) of the measurement report will be obtained, based on the non-beamforming antenna. The CQI parameter is a part of the cell trace information. This parameter receives its position in the three-dimensional space in relation to the position of the massive MIMO antenna during the 3D geo-location process. FIG. 6a illustrates the initial radio condition. The ellipse represents the original horizontal beam of the 4G antenna (more or less equivalent in performance to one of #1's configurations) The antenna is located at the bottom of the ellipse, at the indication #1. The two end subscribers (UE1 and UE2, the dots in FIG. 6a) are located spatially on both sides of the antenna. The original CQI parameter is received from UE1.

At Task #2 the CQI value is converted to signal-to-interference plus noise ratio (SINR) values, also known as signal-to-noise ratio (SNR), depending on the transmission mode. The conversion can be based on specific measurements or other approach that provides such data. For example, a conversion table may be used to convert CQI values to SINR values.

At Task #3, the current RSRP parameter RSRP #1 is received from UE1. This parameter is a part of the cell trace information obtained earlier.

At Task #4 the level of interference and noise is calculated. In a first step, the total level of interference and noise to which the subscriber is exposed in his current state before comparing to the beamforming activation is extracted. The calculation is based on the RSRP obtained at Task #3 and the at Task #2 converted SINR value. The value of the RSRP may be expressed in milliwatts (mW): 10^((rsrp(dBm))/10). Hence, the interference plus noise (in mW) can be calculated as follows:

$$\text{in mW:} I + n = (RSRP)/\text{pure SIN}R$$

$$\text{in } dBm: I + n = 10^* \log_{10}(I + n)$$

At Task #5, the CQI value is converted to spectral efficiency. As it is already stated, the CQI parameter is a part of the cell trace information. The conversion to spectral efficiency is based on the standard 3GPP TS 36.213 Table 7.2.3-1 or Table 7.2.3-2 (based on 256 QAM support) of the version 14.6.0, Release 14. Corresponding tables may be present in later versions the same or with different numbering.

These two tables are represented below as Table 1 and Table 2, respectively.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

In accordance with an embodiment, the spectral efficiency could also be a weighted average, such as SE=Rank1_Avg. CQI+Rank2_Avg. CQI*2+Rank3_Avg. CQI*3+ Rank4_Avg. CQI*4;

where Rank1_Avg., Rank2_Avg., Rank3_Avg. and Rank4_Avg. are weight factors.

At Task #6 the current 4G Antenna gain is obtained. The 3D geo-location provides the position of the UE in the three-dimensional space in relation to the position of the massive MIMO antenna during the 3D geo-location process.

The gain of the 4G (or GOP #1) pattern can be calculated based on 3D antenna's pattern simulation. An example of such pattern simulation at a certain elevation angle (tilt) is depicted in FIG. 6b.

At Task #7 the gain of the massive MIMO GOB antenna is calculated. The calculation may be based on the same concept as in Tas #6 but for the 3D massive MIMO GOB configuration pattern (in an example the GOB configuration pattern is #6). It is expected that the massive MIMO beamforming will provide higher RSRP gain for the data (control signals aren't beamformed) due to the narrower beam. An example is presented in FIG. 6c in which there are only two UEs (UE1, UE2, illustrated by the dots). The largest ellipse drawn as a continuous line represents the non-beamforming configuration #1, the smaller ellipse surrounding the UE1 represents the configuration pattern #6, and the other ellipses drawn as dotted lines represent other examples of different configuration patterns for the beams of the massive MIMO antenna.

At Task #8 the new RSRP for the massive MIMO antenna is calculated. This calculation of the new RSRP for the massive MIMO antenna may be based on the simulation of the gain differences of the different antenna's patterns and the original RSRP. The gain is calculated three-dimensionally according to the position in space of the UE. Hence, a new RSRP value is obtained (in dBm) as follows:

$$\text{New } RSRP \text{ (dB}m) = \text{Original } RSRP +$$

$$\text{(massive } MIMO \; GOB \text{ antenna gain} - \text{current } 4G \text{ antenna gain)}$$

At Task #9 the gains of the massive MIMO GOB of all the beams that cause radio interference are obtained. These may be calculated using similar calculations as performed in Task #6 or Task #7.

Figures 6C, 6D:
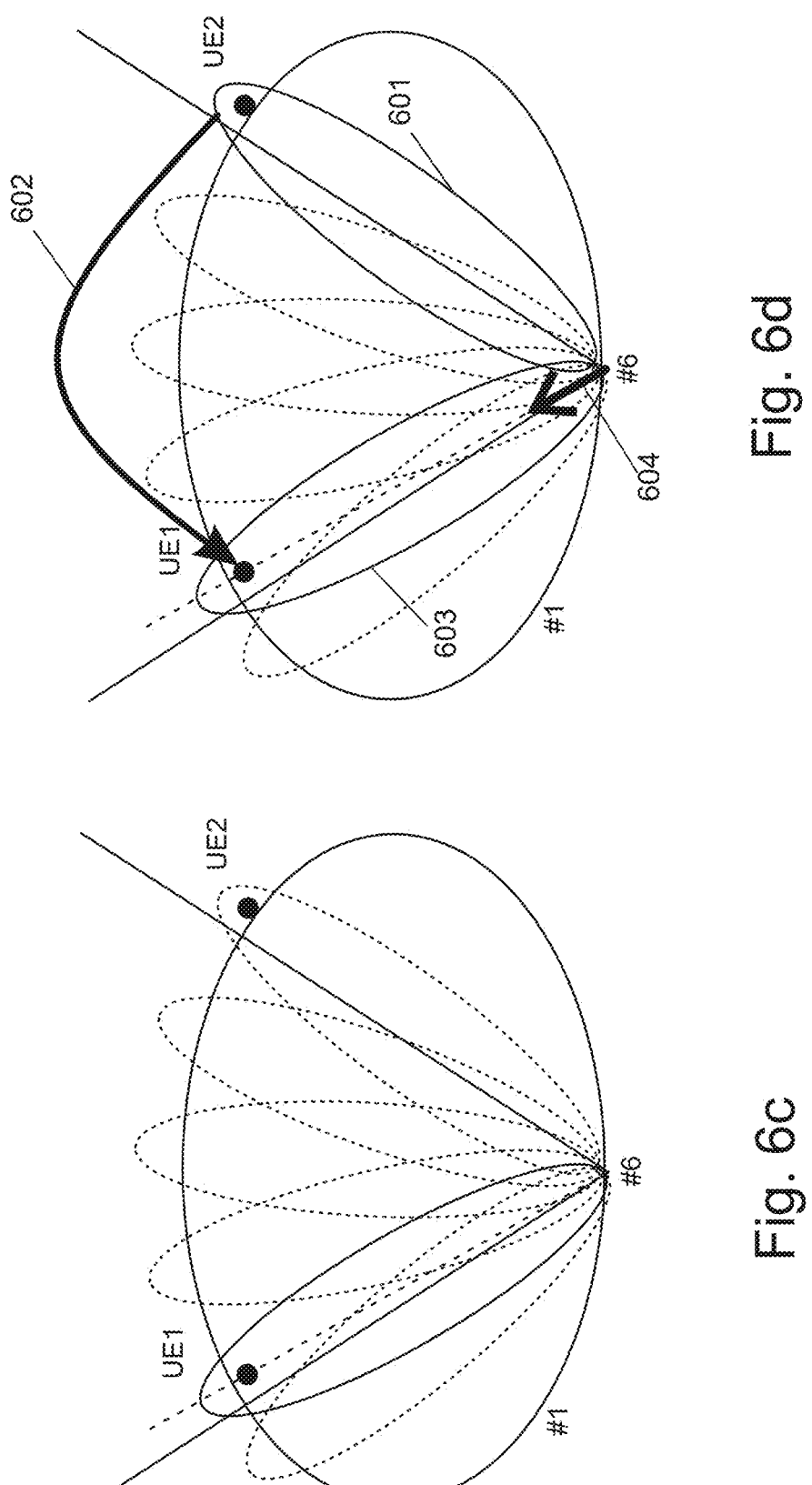
FIG. 6c illustrates an example of radiation patterns of a massive MIMO beamforming.
FIG. 6d illustrates examples of possible interferences caused by a beam of the massive MIMO to another beam of the same massive MIMO.

An example is presented in FIG. 6d in which there are only two UEs (UE1, UE2, illustrated by the dots), each operating a massive MIMO antenna beam. The SSB beam 601 for UE 2 (located on the right) provides service to it but also causes interference to UE 1 (illustrated by the arrow 602), based on the gain/loss 3D pattern of beam 603 towards the UE1 illustrated by the small arrow 604 at the bottom of the figure.

At Task #10 the additional interference from the other massive MIMO beams is simulated. This may be performed by calculating the additional interference from the other massive MIMO beams based on the simulation of the gain of 3D beams patterns and their directions. In the example of FIG. 6d the interference is from the beam #6 (601) that provides service to the UE 2.

At Task #11 the level of the new interference and noise level are calculated by adding the additional internal interferences from the other massive MIMO beams to the original interference and noise level that was calculated at Task #4. This can be a standard RF signal summation calculation.

At Task #12 the value of the new SINR is calculated based on the new RSRP level that was calculated at Task #8 and the total interference and noise level that was calculated at Task #11:

$$\text{New SINR} = \text{New RSRP/New } I + n$$

At Task #13 the new SINR value is converted to a new CQI value e.g. according to the same method as was described above in Task #2 of the process.

At Task #14 the CQI value is converted to a spectral efficiency e.g. according to the same method as was described above in Task #5 of the process.

At Task #15 the final score is provided. The final score may be obtained by comparing the original spectral efficiency of the 4G (Task #5) with the new one based on the massive MIMO GOB configuration in the analysis (Task #14). The final score may be provided as a degree of improvement or degradation in percentage, for example.

The method was successfully tested with real data of dozens of cells from a real network. The verification of the algorithm included a careful examination of various scenarios in which an optimal GOB configuration was identified. For example, static and dynamic scenarios, conflicts between high and low buildings in which there are transitions between high and low network data loads during the day (e.g., shopping malls) and high traffic loads at night (e.g., residential towers), highways with dynamic transitions between hours with traffic jam where speed of vehicles driving on the road is much slower compared to hours when speed of vehicles driving on the road is much higher. The algorithm successfully dealt with all the scenarios when it identified the optimal GOB configuration at each hour, patterns that repeat themselves on a daily or weekly level were identified, differences between weekdays and weekends, identification of hours in which it gave a recommendation to turn off the beamforming to prevent loss during the hours when the beamforming did not provide improvement to the efficiency compared to the non-beamforming alternative. In addition, the algorithm provided information on the level of gain or loss on an hourly basis for each of the cells it analysed.

It is important to emphasize that the verification was carried out in secret to prevent any disclosure of the idea or algorithm to public.

In conclusion, the verification illustrated the distinct advantage of the proposed idea over the existing method. The weighted gain/loss score, based on a three-dimensional analysis of the real traffic, which the new method provides with a minute/hour resolution will allow the customer to make business decisions throughout all the stages of the installation. It starts from the moment of decision before upgrading a cell from 4G to 5G massive MIMO, performance optimization after installation and ongoing monitoring and optimization of the cell over time.

In addition, the new method allows automatic analysis for both static and dynamic situations that may require a dynamic change of the GOB configurations, dealing with ambiguity situations and the ability to identify times when it is necessary to deactivate the beamforming.

Figure 7:
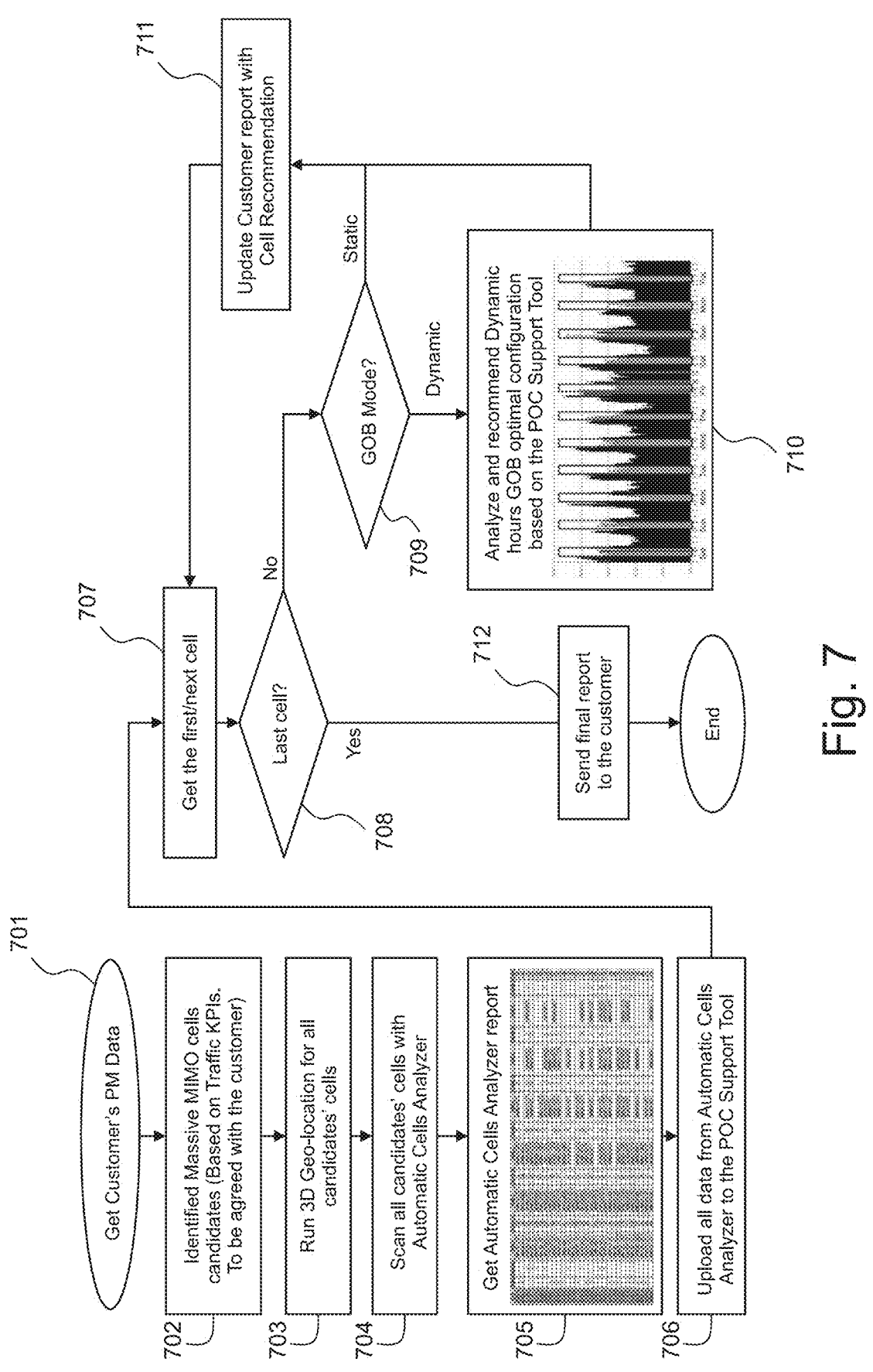
FIG. 7 shows a flow chart describing a work process from an initial data reception to a delivery of a final report to a customer, in accordance with an embodiment.

The flow chart of FIG. 7 describes the work process, already described in more detail above, from the initial data reception 701 to the delivery 712 of the final report to the customer. At Step 702 massive MIMO cell candidates are identified, e.g., based on traffic key performance indices. At Step 703 3D geo-location is performed for candidate cells. The candidate cells may be scanned 704 with an automatic cell analyzer, which may produce 705 an automatic cell analyser report. The automatic cell analyzer gets the 3D geo-location files as an input, scans and analyzes automatically all the candidates' cells and provides the report of the distribution of selected GOB configurations per each cell for, e.g., 24 hours for the entire days collection. At Step 706 the data is uploaded from the automatic cell analyzer to a POC (Proof of Concept) support tool. At Step 707 a first or a next cell is taken for processing and at Step 708 it is examined whether this cell is the last cell to be processed or not. If this cell is not the last cell to be processed, a GOB mode of the cell will be examined 709 and if the GOB mode is dynamic, the procedure forwards to Step 710 for analyzes to produce recommended dynamic hours for an optimal GOB configuration, e.g., based on the POC support tool. The POC support tool gets its input from the automatic analyzer and may provide hourly and daily graphs to present gain/loss of each cell for different GOB configurations. Then, at Step 711 a customer report is updated with cell recommendation. If the Step 707 revealed that the GOB mode is not dynamic but static, Step 710 is not performed but the process forwards to Step 711 without executing Step 710. If Step 708 revealed that the cell under consideration is the last cell to be examined, the report is sent 712 to the customer.

The report may include recommendations for all candidates' cells with massive MIMO GOB configuration plan (e.g., dynamic/static, beamforming/non-beamforming, GOB configuration per hour, etc.) and implementation plan (e.g. antenna's dashboard parameters for static cells, NetAct scripts/GOB scheduler for dynamic cells).

Processing time efficiency may be improved by optimizing and reducing the number of GOB analysis iterations. In the research phase there is no problem to check all the possibilities of all the configurations. On the other hand, as a product, an algorithm may be added that will optimize the running time by rejecting irrelevant GOB configurations (depending on the results obtained).

The accuracy of the massive MIMO radio prediction based on 3D may be improved by simplifying the raytracing model (simplify raytracing model is part of radio propagations models of another Nokia's product that focus on the main diffractions and reflections). The idea is to integrate the existing prediction module as part of the GOB prediction model. This module includes 3D raytracing capabilities that may improve the accuracy of predicting which beams will best serve the subscriber. Improving the accuracy is another element that will raise the optimization another step forward.

In accordance with an embodiment, the manual GOB configuration may be replaced with an automatic machine learning (ML) algorithm. For a product that handles networks of thousands of cells and also continuously monitors changes in patterns over time, an algorithm should be developed to replace the manual process with an automatic, efficient and fast process.

As explained earlier, the GOB optimization has an additional advantage beyond the spectral efficiency optimization. With this dynamic change it is also possible to improve the energy efficiency (e.g. power consumption).

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

LIST OF ABBREVIATIONS

GOB—Grid of Beams, Group of Beams.
ROI—Return on Investment
ARPU—Average Revenue Per User
UC—Use Case
SE—Spectral Efficiency
MR—Measurement Report
CQI—Channel Quality Indicator
SSB (beam)—Synchronization Signal Block

The invention claimed is:

1. An apparatus comprising at least one processor; and at least one memory storing instructions that, when executed by the at least one processor, cause the apparatus to perform at least the following:

selecting a candidate cell of a cellular network, the candidate cell comprising a massive multiple-in multiple out antenna capable of producing a plurality of groups of beams for a beamforming configuration and a beam for a non-beamforming configuration;

obtaining measurement data from one or more user equipments in a geographical area served by the candidate cell at a plurality of time intervals;

locating three-dimensionally the one or more user equipments;

using the location information to determine three-dimensional dispersion of the one or more user equipments in the geographical area at the plurality of time intervals;

determining spectral efficiency for the different groups of beam configurations and the non-beamforming configuration by using the three-dimensional dispersion and the measurement data for different groups of beam configurations at the plurality of time intervals;

comparing the spectral efficiencies of the different groups of beam configurations with the spectral efficiency of the non-beamforming configuration; and selecting an optimal non-beamforming configuration or one of the groups of beam configurations for the cell at the plurality of time intervals.

2. The apparatus according to claim 1, wherein the instructions, with the at least one processor, further cause the apparatus to perform at least the following:

selecting the candidate cell based on a traffic key performance index.

3. The apparatus according to claim 1, wherein the instructions, with the at least one processor, further cause the apparatus to perform at least the following:

locating three-dimensionally a plurality of candidate cells.

4. The apparatus according to claim 1, wherein the instructions, with the at least one processor, further cause the apparatus to determine the spectral efficiency by simulating different groups of beam configurations and the non-beamforming configuration for a plurality of predetermined time intervals.

5. The apparatus according to claim 1, wherein the instructions, with the at least one processor, further cause the apparatus to perform at least the following:

determining whether the three-dimensional dispersion includes repetitive patterns at different time instances; and deciding whether to switch the beamforming on or off for time instances corresponding to a determined repetitive pattern.

6. The apparatus according to claim 1, wherein the instructions, with the at least one processor, further cause the apparatus to perform at least the following:

identifying a level of external interference and its environmental noise level.

7. The apparatus according to claim 1, wherein the instructions, with the at least one processor, further cause the apparatus to perform at least the following:

performing a three-dimensional radio simulation of one of the configurations that includes an improvement of coverage because of the narrowness of the beam that provides service, and an increase of level of interference because of activating additional beams.

8. The apparatus according to claim 1, wherein the instructions, with the at least one processor, further cause the apparatus to repeat the obtainment of measurement data at several time intervals, the three-dimensional localization of the one or more user equipments, the usage of the location information to determine three-dimensional dispersion of the one or more user equipments in the geographical area at the different time intervals, the determination of spectral efficiency for the different group of beam configurations and the non-beamforming configuration, comparison of the spectral efficiencies of the different groups of beam configurations with the spectral efficiency of the non-beamforming configuration, and the selection of a non-beamforming configuration or one of the groups of beam configurations for the cell at the plurality of time intervals.

9. The apparatus according to claim 1, wherein the instructions, with the at least one processor, further cause the apparatus to perform at least the following:

reporting the selected configuration for different time intervals.

10. A method comprising:

selecting a candidate cell of a cellular network, the candidate cell comprising a massive multiple-in multiple out antenna capable of producing a plurality of groups of beams for a beamforming configuration and a beam for a non-beamforming configuration;

obtaining measurement data from one or more user equipments in a geographical area served by the candidate cell at a plurality of time intervals;

locating three-dimensionally the one or more user equipments;

using the location information to determine three-dimensional dispersion of the one or more user equipments in the geographical area at the plurality of time intervals;

determining spectral efficiency for the different groups of beam configurations and the non-beamforming configuration by using the three-dimensional dispersion and the measurement data for different groups of beam configurations at the plurality of time intervals;

comparing the spectral efficiencies of the different groups of beam configurations with the spectral efficiency of the non-beamforming configuration; and selecting an optimal non-beamforming configuration or one of the groups of beam configurations for the cell at the plurality of time intervals.

11. The method according to claim 10, further comprising:

selecting the candidate cell based on a traffic key performance index.

12. The method according to claim 10, further comprising:

locating three-dimensionally a plurality of candidate cells.

13. The method according to claim 10, further comprising:

determining the spectral efficiency by simulating different groups of beam configurations and the non-beamforming configuration for a plurality of predetermined time intervals.

14. The method according to claim 10, further comprising:

determining whether the three-dimensional dispersion includes repetitive patterns at different time instances; and deciding whether to switch the beamforming on or off for time instances corresponding to a determined repetitive pattern.

15. The method according to claim 10, further comprising:

identifying a level of external interference and its environmental noise level.

16. The method according to claim 10, further comprising:

performing a three-dimensional radio simulation of one of the configurations that includes an improvement of coverage because of the narrowness of the beam that provides service, and an increase of level of interference because of activating additional beams.

17. The method according to claim 10, further comprising:

repeating the obtainment of measurement data at several time intervals, the three-dimensional localization of the one or more user equipments, the usage of the location information to determine three-dimensional dispersion of the one or more user equipments in the geographical area at the different time intervals, the determination of spectral efficiency for the different group of beam configurations and the non-beamforming configuration, comparison of the spectral efficiencies of the different groups of beam configurations with the spectral efficiency of the non-beamforming configuration, and the selection of a non-beamforming configuration or one of the groups of beam configurations for the cell at the plurality of time intervals.

18. The method according to claim 10, further comprising:

reporting the selected configuration for different time intervals.

19. A non-transitory computer readable medium comprising program instructions, that when executed by an apparatus, cause the apparatus to perform the steps of:

selecting a candidate cell of a cellular network, the candidate cell comprising a massive multiple-in multiple out antenna capable of producing a plurality of groups of beams for a beamforming configuration and a beam for a non-beamforming configuration;

obtaining measurement data from one or more user equipments in a geographical area served by the candidate cell at a plurality of time intervals;

locating three-dimensionally the one or more user equipments;

using the location information to determine three-dimensional dispersion of the one or more user equipments in the geographical area at the plurality of time intervals;

determining spectral efficiency for the different groups of beam configurations and the non-beamforming configuration by using the three-dimensional dispersion and the measurement data for different groups of beam configurations at the plurality of time intervals;

comparing the spectral efficiencies of the different groups of beam configurations with the spectral efficiency of the non-beamforming configuration; and selecting an optimal non-beamforming configuration or one of the groups of beam configurations for the cell at the plurality of time intervals.

* * * * *